Jan. 16, 1923.            1,442,676.

J. LOBOJOK.
MEAT GRINDER ATTACHMENT.
FILED JULY 26, 1921.

Inventor
John Lobojok

By Victor J. Evans
Attorney

Patented Jan. 16, 1923.

1,442,676

UNITED STATES PATENT OFFICE.

JOHN LOBOJOK, OF NEWARK, NEW JERSEY.

MEAT-GRINDER ATTACHMENT.

Application filed July 26, 1921. Serial No. 487,630.

*To all whom it may concern:*

Be it known that I, JOHN LOBOJOK, a citizen of Poland, residing at Newark, in the county of Essex and State of New Jersey, have invented new and useful Improvements in Meat-Grinder Attachments, of which the following is a specification.

In power driven meat grinders, the stub shaft of the worm which has a squared portion to receive the squared bore of the knife, passes through a boss, in the nature of a hub on the apertured disk through which the ground meat passes. A quantity of this meat will drop upon the projecting end of the stub shaft, and in course of time will fill the bore of the hub of the disk and reenter the casing. This meat being exposed to the atmosphere soon becomes tainted, and mixing with the meat in the grinder contaminates the same, with the result that large quantities of perfectly good meat are thus spoiled.

It is the object of the present invention to produce a means for preventing ground meat which is projected through the disk of the grinder casing from dropping upon the stub shaft of the feed screw and reentering the casing to contact with and contaminate the good meat ground in the casing.

It is a further object to produce a protector device of this character which shall be of an extremely simple construction, which may be readily attached to any ordinary construction of meat grinders, and which will be thoroughly efficient in performing its functions.

It is a still further object to produce a protector device for the purpose set forth comprising a member which is screwed on the hub of the grinder disk and which has its outer end closed by a removable plug whereby access may be obtained to the interior thereof as well as to the bore of the hub so that juices or oils from the ground meat, as well as any particles of meat which may enter the hub or protector, may be readily removed therefrom.

The foregoing objects may be accomplished by a construction, combination and operative association of parts, such as are disclosed by the drawings which accompany and which form part of this specification.

In the drawings:—

Figure 1:
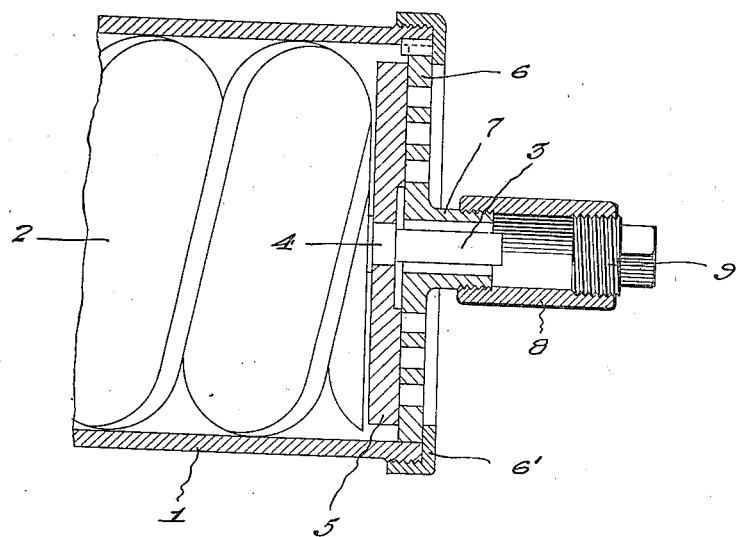
Figure 1 is an approximately central vertical longitudinal sectional view through the outlet end of a meat grinder illustrating the application of the improvement, the latter being also in section except for the plug therefor, and the spiral feed and its shaft being in elevation.
Figure 2:
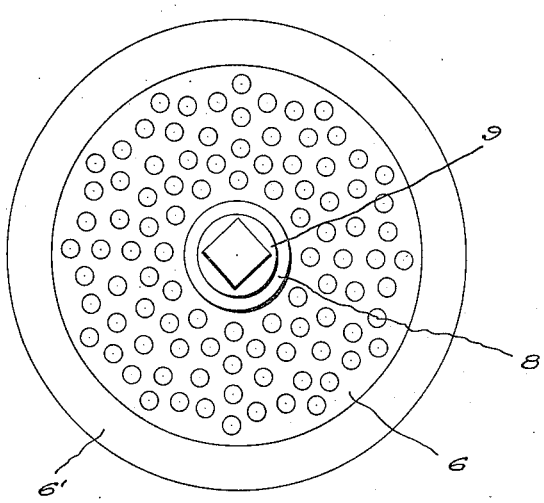
Figure 2 is a front elevation looking toward the outlet face of the grinder and showing the improvement applied.
Figure 3:
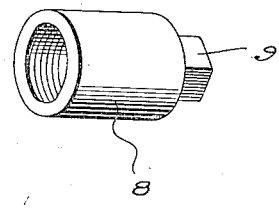
Figure 3 is a perspective view of the protector.

Referring now to the drawings in detail, the numeral 1 designates the casing of an ordinary power driven meat grinder. In the grinder is the usual feed screw 2 that has its end provided with the usual stub shaft 3, the latter having a squared inner portion 4 that it received in the squared bore of the knife 5. On the outlet end of the casing there is the usual perforated disk 6, removably secured therein by a flanged threaded ring 6'. The disk 6 is centrally provided with the usual hub 7 that projects a suitable distance outward from the casing, and through the bore of the hub, the stub shaft 3 passes. The stub shaft does not contact with the bore of the hub, being spaced a suitable distance therefrom, but the stub shaft projects a considerable distance beyond the end of the hub. With the ordinary construction of such devices, meat cut by the knife and passing through the apertures in the disk 6 will drop on to the hub 7 and on to the projecting end of the stub shaft 3. This meat is exposed to the atmosphere, and the revolving stub shaft has a tendency to draw the same into the bore of the hub 7, causing the meat to pass between the knife and the disk and to contact with the meat in the grinder. Such ground meat is, for a considerable time, exposed to the atmosphere, and in reality soon does become contaminated, and such ground meat mixing with the good meat will contaminate the latter. Thus, large quantities of perfectly good meat have been spoiled in the process of grinding, and therefore the means, hereinafter described, which prevents such contamination will be perfectly understood and appreciated by those skilled in the art to which such inventions relate.

The protector means comprises a comparatively short pipe member 8 having interior threads at both of its ends, whereby the same may be screwed upon the threaded end of the hub 7 of the disk 6, and also whereby the opposite threaded end may be closed by a removable plug 9. The pipe section or sleeve 8 wholly receives the projecting end of the stub shaft 3 in the bore thereof and also closes the bore of the hub 7. Thus meat being forced by the screw and knife through the apertures in the disk 6 will fall upon the outer surface of the sleeve 8 and will be prevented from contacting with the stub shaft 3 and entering the bore of the hub 7. The plug 9 may be readily removed from the sleeve so that access to the bore thereof may be obtained and as a consequence, the sleeve 8 and the bore 7 of the disk 6, as well as the stub shaft 3 may be effectively cleaned when occasion requires.

Having described the invention, I claim:—

The combination with a meat grinder having its apertured disk provided with an extending exterior hub which receives therethrough the stub shaft of the feed screw, of means for preventing ground meat which is projected through the apertured disk from dropping on to the stub shaft and reentering the grinder and contaminating the meat therein, comprising an interiorly threaded sleeve of an equal cross sectional diameter throughout designed to have either of its ends screwed on the hub and to receive the stub shaft therein, and a threaded plug for closing the outer end of the screw.

In testimony whereof I affix my signature.

JOHN LOBOJOK.